US008655582B2

(12) United States Patent
Philbin et al.

(10) Patent No.: US 8,655,582 B2
(45) Date of Patent: Feb. 18, 2014

(54) METHOD AND SYSTEM FOR ROUTE BASED SEARCH INCLUDING STOPPING POINT ADDITION

(75) Inventors: David Anthony Philbin, Arlington, MA (US); Hannah Youngsil Moon, Boston, MA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 470 days.

(21) Appl. No.: 12/749,081

(22) Filed: Mar. 29, 2010

(65) Prior Publication Data
US 2010/0185385 A1 Jul. 22, 2010

Related U.S. Application Data

(63) Continuation of application No. 11/087,337, filed on Mar. 23, 2005, now Pat. No. 7,729,947.

(51) Int. Cl.
*G01S 1/24* (2006.01)
(52) U.S. Cl.
USPC ........... 701/426; 701/400; 701/410; 701/420; 701/431; 701/438; 701/461; 701/467; 701/487; 701/491
(58) Field of Classification Search
USPC ................. 701/200–226, 400–475, 487, 491; 705/21.6–27.2, 26.1–27.2
See application file for complete search history.

(56) References Cited

U.S. PATENT DOCUMENTS

| | | | |
|---|---|---|---|
| 5,559,707 A | 9/1996 | DeLorme et al. | |
| 5,648,768 A | 7/1997 | Bouve | |
| 6,124,810 A | 9/2000 | Segal et al. | |
| 6,282,489 B1 | 8/2001 | Bellesfield et al. | |
| 6,349,257 B1 | 2/2002 | Liu et al. | |
| 6,401,034 B1 * | 6/2002 | Kaplan et al. | 701/209 |
| 6,498,982 B2 | 12/2002 | Bellesfield et al. | |
| 7,171,304 B2 | 1/2007 | Wako | |
| 7,239,960 B2 | 7/2007 | Yokota et al. | |
| 7,248,965 B2 | 7/2007 | Tanizaki et al. | |
| 2002/0038180 A1 | 3/2002 | Bellesfield et al. | |
| 2002/0133289 A1 | 9/2002 | Miyaki | |
| 2002/0138196 A1 * | 9/2002 | Polidi et al. | 701/208 |
| 2003/0036848 A1 * | 2/2003 | Sheha et al. | 701/209 |
| 2003/0065805 A1 | 4/2003 | Barnes | |
| 2003/0182052 A1 | 9/2003 | DeLorme et al. | |
| 2003/0212996 A1 | 11/2003 | Wolzien | |
| 2005/0102097 A1 | 5/2005 | Tanizaki et al. | |
| 2005/0107949 A1 * | 5/2005 | Yokota | 701/209 |
| 2006/0089788 A1 * | 4/2006 | Laverty | 701/202 |
| 2006/0109144 A1 | 5/2006 | Xu et al. | |
| 2006/0167621 A1 * | 7/2006 | Dale | 701/202 |
| 2006/0241857 A1 | 10/2006 | Onishi et al. | |
| 2010/0191462 A1 * | 7/2010 | Kobuya et al. | 701/208 |

OTHER PUBLICATIONS

Excerpt taken from http://www.aaamaps.com, Jun. 9, 2005.

(Continued)

*Primary Examiner* — William Allen

(57) ABSTRACT

A route may be created and provided to a client. A stopping point along the route is received, and a search is performed for at least one point of interest according to the stopping point. Further, a route is created and provided to a client, and at least one stopping point associated with the route is identified based on at least one of a distance along the route, an indication of a place on a map, a category search, and a key word search.

22 Claims, 21 Drawing Sheets

(56) References Cited

OTHER PUBLICATIONS

"Magellan MapSend Topo 3D USA; First to Provide Searchable Maps and Points of Interest from Trails. Com, NavTeq and U.S. Geological Survey". PR Newswire, p. NA, Dec. 13, 2004.[recovered from Dialog database on Dec. 17, 2009].

Excerpt taken from http://www.superpages.com, Jun. 9, 2005.

Excerpt taken from http://www.tripking.com, Jun. 9, 2005.

Excerpt taken from htto://www.us.map24.com, Jun. 9, 2005.

* cited by examiner

FIG. 8

MAPS & DRIVING DIRECTIONS

Home → Maps → Route-Based Search

Route-Based Search

Plan A Route     Add Stopping Point(s)     Get Driving Directions

Add up to 50 stopping points (e.g., hotels, restaurants, aunt's house) to your route using one of the four select methods.

Name this stop:
[(optional)]

Select Method
- ○ Stop Here
- ● Stop Here And Search For Businesses
- ○ Search For Businesses
- ○ Search For A Person
- ○ Search The Route Near Here

Change Route To Stop Here:
3 Parliament St., Philadelphia, PA

And Search for Nearby Businesses
Please select a type of business:
Hotels, Motels & Inns
CampGrounds & Parks
Gas & Service Stations
Restaurants - Fast Food
Restaurants - All Others
Banks & ATMs
Fun Places To Stop More Search Options

Click for Local Current & Extended Weather Forecasts!

| | | |
|---|---|---|
| 0.0 then | 12: Turn RIGHT to stay on Ramp | |
| 0.2 then | 13: Bear RIGHT (South) onto Wyman St | |
| 0.0 then | 14: Bear RIGHT (West) onto Totten Pond Rd | |
| 0.4 then | 15: Road name changes to Winter St | |
| 0.0 then | 16: Turn LEFT (South) onto Sylvan Rd | |
| 0.0 then | 17: Arrive | |

Estimated Total Distance: 443 Miles          Estimated Total Time: 7 hours, 25 minutes

---

All Selected Businesses (edit)

⚑ Near Start
100 Beacon St, Boston, MA

Restaurants

❶ Wirth Jacob
31-37 Stuart, Boston, MA 02116
(617) 338-8586
(617) 426-5049 (fax)

Appears in the Categories:
Entertainment
Restaurant American
Restaurant Fine Dining
Restaurants German
Restaurants http://www.jacobwirth.com
Request a Quote - MerchantMatch ❷ Garden Of Eden
571 Tremont, Boston, MA 02118
(617) 247-8377
(617) 247-8493 (fax)

Appears in the Categories:
Bakers Wholesale & Retail
Cafes
Caterers
Gourmet Shops & Food Services
Restaurants http://www.goeboston.com
Request a Quote - MerchantMatch ⚑ Near Lunch Break
Milford, CT ⚑ Near Sleep - Ritz Carlton
50 Central Park, New York, NY
(212) 521-6000
(212) 207-8831 (fax)

Appears in the Categories:
Hotel Reservations
Hotels
Hotels & Motels-Out of Town Reservations
Motels & Hotels http://www.ritz_carlton.com ⚑ Near David's Place
3 Parliament Street, Philadelphia, PA ⚑ Near End
100 Main Street, Washington, DC

[Print-Friendly Version]

These maps and driving directions are provided for general reference purposes only. No representation is made or warranty is given as to their content or the reliability thereof. User assumes all risk of use. Verizon Directories Corp., its affiliates and suppliers assume no responsibility for any loss or delay resulting from such use. Please call ahead to verify the location and directions.

*FIG. 23B*

METHOD AND SYSTEM FOR ROUTE BASED SEARCH INCLUDING STOPPING POINT ADDITION

CROSS REFERENCE TO RELATED APPLICATIONS

This application is a continuation of U.S. patent application Ser. No. 11/087,337, filed on Mar. 23, 2005, which is hereby incorporated by reference in its entirety.

RELATED APPLICATIONS

This application is related to U.S. application Ser. No. 10/948,425, entitled "Business Rating Placement Heuristic," filed Sep. 23, 2004; U.S. application Ser. No. 11/060,243, entitled "Improving Search Relevance And Yellow Page Classification Integration by Using Business Profile Content And Vertical Industry Templates," filed Feb. 17, 2005; U.S. application Ser. No. 11/060,209, entitled "Method For Extraction And Selection Of Enhanced Business Information From Websites, Business Profiles And Advertising Products," filed Feb. 17, 2005; U.S. application Ser. No. 10/872,050, entitled "Automated Search Parameter Resubmission For Map Based Searches," filed Jun. 18, 2004; U.S. application Ser. No. 10/872,266, entitled "Stackable Icons," filed Jun. 18, 2004; U.S. application Ser. No. 10/872,051, entitled "Hierarchial Category Index Navigational System," filed Jun. 18, 2004; application Ser. No. 10/800,887, entitled "Information Distribution System And Method That Provides For A Position Adjustment Factor," filed Mar. 15, 2004; application Ser. No. 10/801,156, entitled "Information Distribution System And Method That Provides For Enhanced Display Formats," filed Mar. 15, 2004; application Ser. No. 10/800,444, entitled "Information Distribution System And Method That Organizes Listings Using Tiers," filed Mar. 15, 2004; U.S. application Ser. No. 10/680,952, entitled "Information Distribution System," filed Oct. 8, 2003; and U.S. Provisional Application 60/505,597, entitled "Information Distribution System," filed Sep. 24, 2003. Each of the above-referenced applications is hereby incorporated herein by reference in its entirety.

BACKGROUND

Applications, e.g., software applications available over the World Wide Web, that provide driving directions, and that plot driving routes on maps, are well known. For example, many presently existing applications allow a user to provide a specific starting address, e.g., an address in Detroit, Mich., and a specific destination address, e.g., an address in New York, N.Y. Such presently existing applications might then provide the user with a set of step-by-step directions regarding the route to take to get from a specified starting address to the specified destination address. Further, such known applications may plot a driving route on a map to provide a visual representation of the provided driving directions. Further, some presently existing applications have the ability to suggest stopping points along the suggested driving route.

However, existing applications are limited to providing users with a suggested list of stopping points based on short lists of business categories. For example, a user may be able to specify an interest in stopping points associated with "restaurants," but the user will be unable to specify the names of specific restaurants at which the user would like to stop. Thus, users of existing applications are unable to specify the precise location of their desired stopping points, nor are they able to specify with precision what they would like those stopping points to be.

Further, persons driving from point A to point B often may want to stop along the way at a specific street address. For example, someone driving from Detroit to New York may want to stop to see a friend in Cleveland. Moreover, a person driving from point A to point B might want to specify a particular place on a map at which the person would like to stop while enroute, e.g., to get gas, visit an attraction, etc. For example, the person driving from Detroit to New York may wish to stop at Niagara Falls, which may be easily found on a map. Further, a person driving from point A to point B may want to stop a certain distance from either point A or point B along the route. For example, the person driving from Detroit to New York may wish to stop after driving two-hundred (200) miles from Detroit, e.g., to get gas. Further, a person driving from point A to point B may want to stop along the way for a specific purpose, e.g., to buy a gift for a friend, before having lunch with the friend at a Chinese restaurant. Similarly, the person driving from point A to point B may wish to stop at a specific business of other location along the way. However, existing applications do not allow users to specify where they wish to stop according to points on maps or according to specific purposes or location names.

Accordingly, a need exists for an interactive route based search application that allows users to search for stopping points along driving routes, where the stopping points satisfy the user's precise search criteria.

BRIEF DESCRIPTION OF THE DRAWINGS

FIG. 8 shows an exemplary user interface, according to an embodiment, in which a user has made a selection of a stopping point.

FIG. 9 depicts an exemplary user interface according to an embodiment, in which a user has made a selection of a stopping point and an indication to search.

FIGS. 10 and 11 depict exemplary user interfaces, according to an embodiment, in which a user has made indications to search for an entity, e.g., a business or a person.

FIG. 12 depicts an exemplary user interface, according to an embodiment, in which a user has made an indication to search near a route.

FIG. 15 shows an exemplary user interface in which a user has made a selection to search near a closest city, according to an embodiment.

FIG. 19 is an exemplary user interface, according to an embodiment, in which a user can select a category.

FIGS. 23A and 23B show an exemplary user interface, according to an embodiment, in which driving directions with stopping points are displayed.

DETAILED DESCRIPTION

Figure 1:
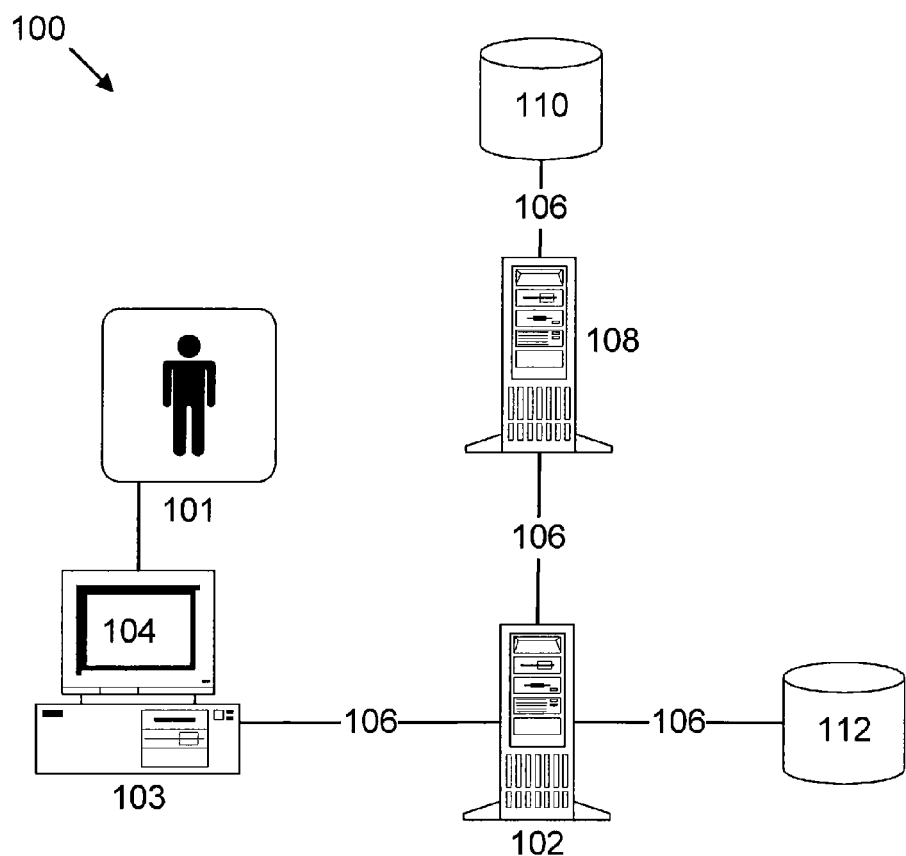
FIG. 1 provides an overview of a system that may be accessed by a user, according to an embodiment.

FIG. 1 provides an overview of a system 100 that may be accessed by a user 101, according to an embodiment. Computer 103 may be any one of a wide variety of computing devices known to those skilled in the art, including a desktop computer, a laptop or notebook computer, a handheld computer such as a cell phone or personal digital assistant, etc. User 101 may provide input to computer 103 via any one of a variety of input devices (not shown) that will be known to those skilled in the art. User 101 views output from computer 103 via a display 104. Computer 103 includes software to enable access to a server 102. Such software may include, but is not necessarily limited to, a web browser such as will be known to those skilled in the art. In many embodiments, server 102 is a web server such as will be known to those skilled in the art.

In some embodiments, server 102 and computer 103 are the same physical computing device. In other embodiments, server 102 and computer 103 communicate via a connection 106. Connection 106 is generally a network connection such as will be known to those skilled in the art, and may include an internet connection, or a connection to a local area network (LAN) or wide area network (WAN). However, connection 106 may use any kind of telecommunications or computer network known to those skilled in the art.

Server 102 also communicates with a map server 108. In some embodiments, server 102 and map server 108 are the same physical computing device, although in other embodiments server 102 and map server 108 communicate via a connection 106. Map server 108 also communicates with a map database 110, either via a connection 106 or by virtue of locating map server 108 and map database 110 on the same physical computing device. In one embodiment, map server 108 and map database 110 are effectively replaced by an application service provider such as the Microsoft® Map-Point Web Service offered by Microsoft Corporation of Redmond, Wash., which is known to those skilled in the art.

Server 102 also communicates with an information database 112. Server 102 and information database 112 may exist on one physical computing device, or may communicate via a connection 106.

Information database 112 includes data relating to the locations and other information associated with entities such as individuals, businesses, government agencies, etc. For each individual and/or business listed in information database 112, associated information may include a street address, a telephone number, as well as data providing information about a category or categories to which the person or business belongs. In some embodiments, information database 112 includes a yellow pages directory and/or a white pages directory such as is known to those skilled in the art. Storing and retrieving information related to entities listed in information database 112 is described in more detail in the presently co-pending applications fully incorporated by reference herein above.

Those skilled in the art will understand that the processes explained below may be tangibly embodied as one or more computer programs stored on computer readable media attached to computer 103, servers 102 and 108, and/or databases 110 and 112. Further, it should be understood that system 100 depicted in FIG. 1 and the processes described below are presented herein to explain rather than limit the claimed invention, and that the claimed invention could be practiced in different configurations and with different process flows than those described herein.

Figure 2:
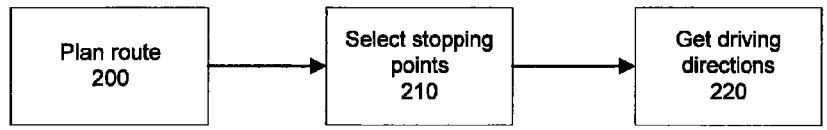
FIG. 2 depicts a high level view of a route planning process, according to an embodiment, including the selection of stopping points and the provision of driving directions.

FIG. 2 depicts a high level view of a route planning process, according to an embodiment, including the selection of stopping points and the provision of driving directions.

In step 200, a user 101 plans a route, including a start point and an end point. A process of planning a route is described in more detail below with reference to FIGS. 3 and 4.

In step 210, the user 101 selects stopping points along the route specified in step 200. The process of selecting stopping points is described in more detail below with reference to FIGS. 5 through 22.

In step 220, the user 101 is provided with driving directions. Driving directions are discussed in more detail below with reference to FIGS. 23A and 23B.

Figure 3:
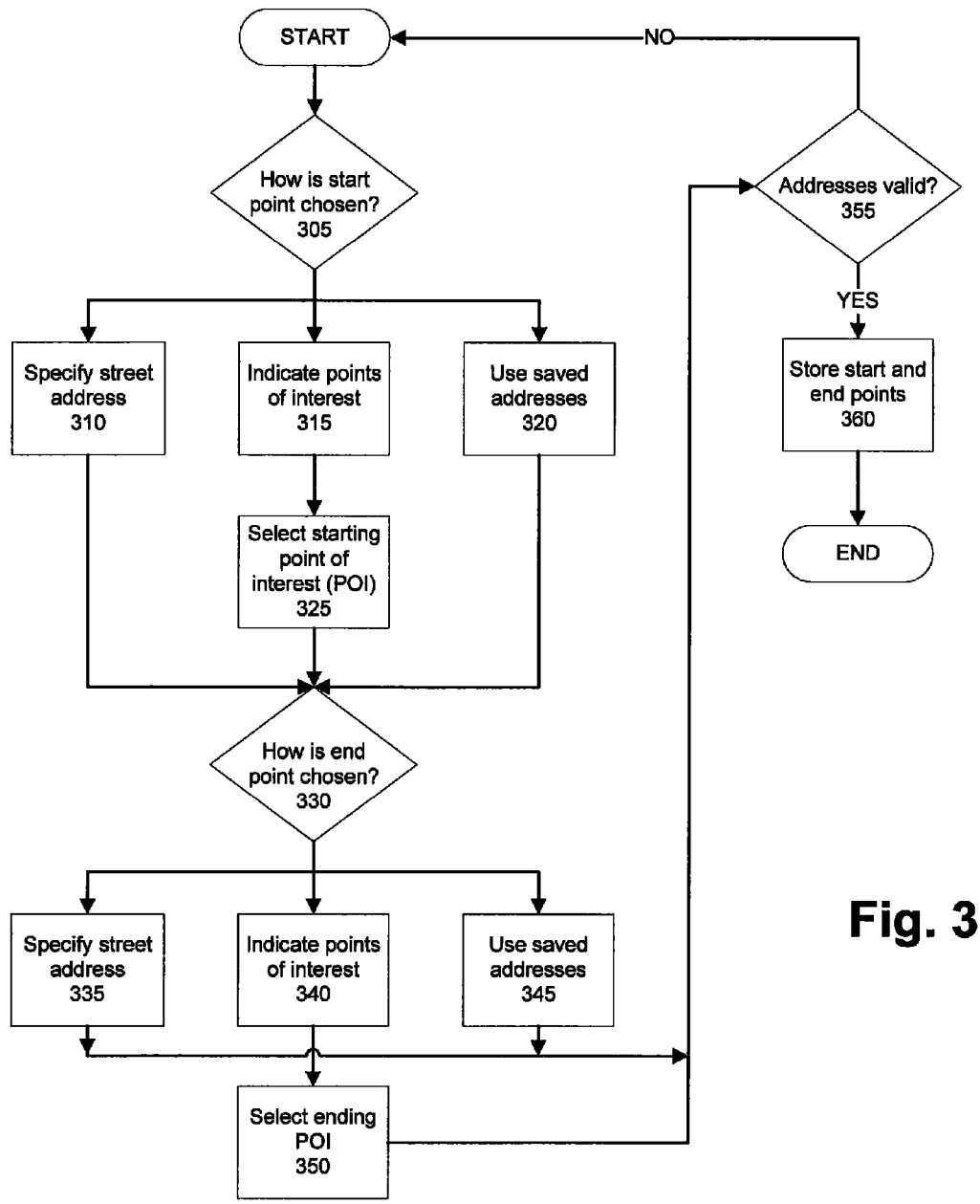
FIG. 3 depicts a process flow for planning a driving route, according to an embodiment.

FIG. 3 depicts a process flow for planning a driving route, according to an embodiment.

Figure 4:
FIG. 4 depicts a screen shot, according to one embodiment, whereby the user is able to select a manner of selecting a starting point.

In step 305, the user 101 provides input to computer 103 indicating a manner in which a starting point is to be chosen. Control then proceeds to one of steps 310, 315, or 320, according to the input received. FIG. 4 depicts a screen shot, according to an embodiment, whereby the user 101 is able to select a manner of selecting a starting point. Those skilled in the art will understand that there are a variety of ways in which users 101 may be asked to specify a starting point, including, but by no means limited to, specifying a street address, specifying a point of interest (e.g., an airport, amusement, park, etc.), or relying on an address that has been saved for the user 101 in information database 112 and/or on server 102.

In step 310, the user 101 specifies a street address by providing input to computer 103. An input form for providing a street address according to one embodiment is depicted in FIG. 4.

In step 315, the user 101 provides input to computer 103 to select stopping points based on points of interest. For example, the user 101 may be presented with a list of categories of points of interest, such as restaurants, museums, hotels, amusement parks, etc. From step 315, control proceeds to step 325, in which the user 101 is presented with possible points of interest which the user 101 can then select as a starting point of interest (POI).

In step 320, the user 101 selects a staring point based on addresses that have been saved in information database 112 and associated with the particular user 101.

In each of steps 310, 320, and 325, the selected starting POI is submitted to server 102, whereupon control proceeds to step 330. Alternatively, the selected starting point may be submitted to server 102 at some other time, such as following steps 335, 345, and 350, described below.

In step 330, the user 101 selects a manner of specifying an endpoint for the intended driving route of the user 101. Accordingly, points are selected in either of steps 335, 340, and 345, in the same manner as discussed above with respect to 310, 315, and 320. Further, from step 340, control proceeds to step 350, just as described above regarding steps 315 and 325.

In each of steps 335, 345, and 350, the selected ending POI is submitted to server 102, whereupon control proceeds to step 330.

In step 355, server 102 validates the addresses of the starting and ending points chosen by the user 101. Generally, this is accomplished by submitting these addresses to map server 108, which in turn determines whether the addresses specified by the user 101 exist in map database 110. Alternatively, the addresses submitted by the user 101 could be checked against a list of possible valid addresses stored in information database 112.

If the server 102 determines in step 355 that one or both of the addresses provided by the user 101 are invalid, the user 101 is returned to the beginning of the process depicted in FIG. 3. It will be understood that if the server 102 determines that the starting point submitted by the user 101 is valid, but the ending points submitted by the user 101 is not, the user 101 could be taken directly to step 330 of FIG. 3. Similarly, if the starting point is not valid, although the submitted ending point is valid, the process depicted with respect to FIG. 3 could end immediately after step 325. If the addresses submitted by the user 101 are both valid, then control proceeds to step 360.

In step 360, the starting and ending points submitted by the user 101 are stored in information database 112.

It will be understood by those skilled in the art that with reference to the steps described in FIG. 3, input provided by the user 101 is generally submitted to, and processed by, server 102. It will be further understood that server 102 will return output to computer 103, which then formats and displays such output for user 101 on display 104.

Following step 360, the process described with respect to FIG. 3 ends.

Figure 5:
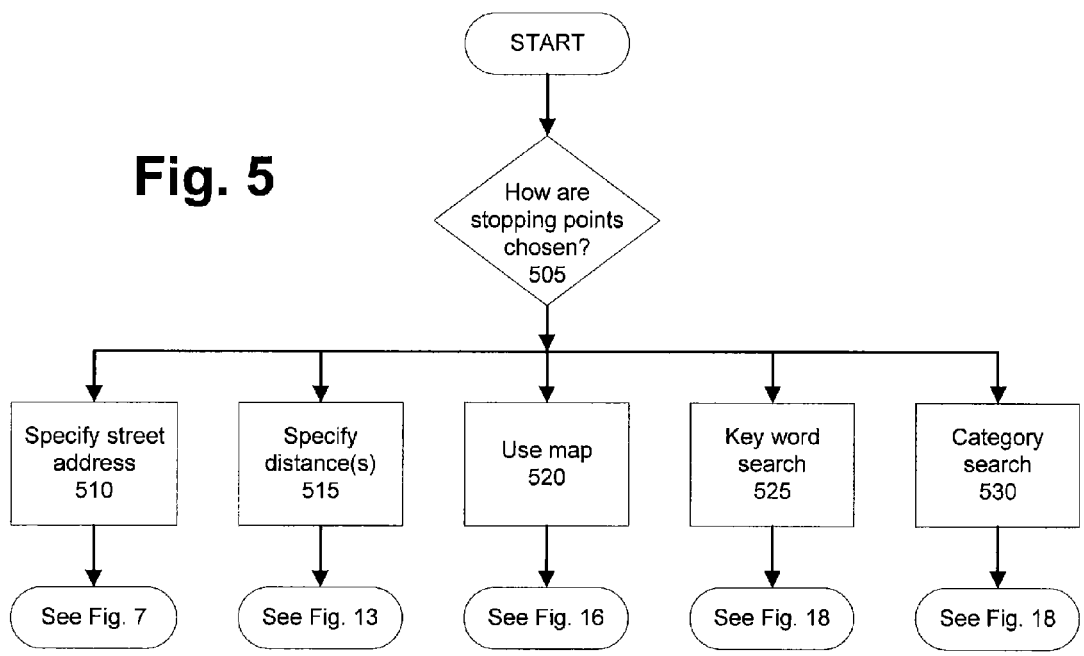
FIG. 5 provides a high level process flow for selecting stopping points along a driving route, according to an embodiment.

FIG. 5 provides a high level process flow for selecting stopping points along a driving route, according to an embodiment.

In step 505, the user 101 specifies a manner of selecting stopping points along an indicated driving route, such as, for example, the driving route chosen as described with respect to FIG. 3. According to the user's indication, control proceeds to any one of steps 510, 515, 520, 525, or 530. Execution of step 510, choosing a stopping point by specifying a street address, is described more fully below with reference to FIG. 7. Execution of step 515, choosing a stopping point by specifying a distance from a starting point or an ending point, is described more fully with reference to FIG. 13 below. Execution of step 520, specifying a stopping point by using a map, is described more fully with reference to FIG. 16 below. Execution of step 525, choosing a stopping point by doing a key word search, e.g., a search based on a name of a person or business provided by a user 101, is described more fully with reference to FIG. 18 below. Execution of step 530, choosing a stopping point by doing a category search, is also described more fully with reference to FIG. 18 below.

With respect to the process described by FIG. 5, as well as the processes described below with respect to FIGS. 7, 13, 16, and 18, it is to be understood that stopping points and other points, e.g., points of interest, start points and end points on a driving route, etc., may be associated with a latitude and longitude or some other coordinate system for the purpose of determining the relative locations and distances of points from one another. For example, when a user 101 specifies a street address as described with reference to step 510, those skilled in the art will recognize that it is possible to associate the street address with a latitude and longitude via a lookup table or some other association in information database 112. Similarly, when a user 101 clicks on a map to select a point, as occurs when the user 101 makes the selection discussed with reference to step 520, those skilled in the art will recognize that a latitude and longitude will be associated with the selected point. Further, information associated with entities such as businesses and people stored in information database 112 will have associated with it location data such as a street address, postal code, telephone area code, etc., to enable an association with a latitude and longitude or some other coordinates to determine the relative locations and distances of these entities from various points.

Figure 6:
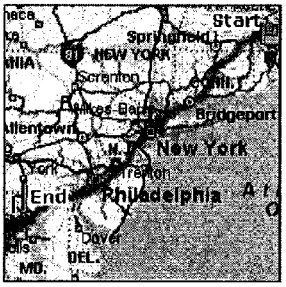
FIG. 6 depicts a screen shot, according to an embodiment, of an interface through which a user is able to provide input to a computer indicating to add a stopping point to a driving route.

FIG. 6 depicts a screen shot, according to an embodiment, of an interface through which a user 101 is able to provide input to computer 103 indicating to add a stopping point to a driving route.

Figure 7:
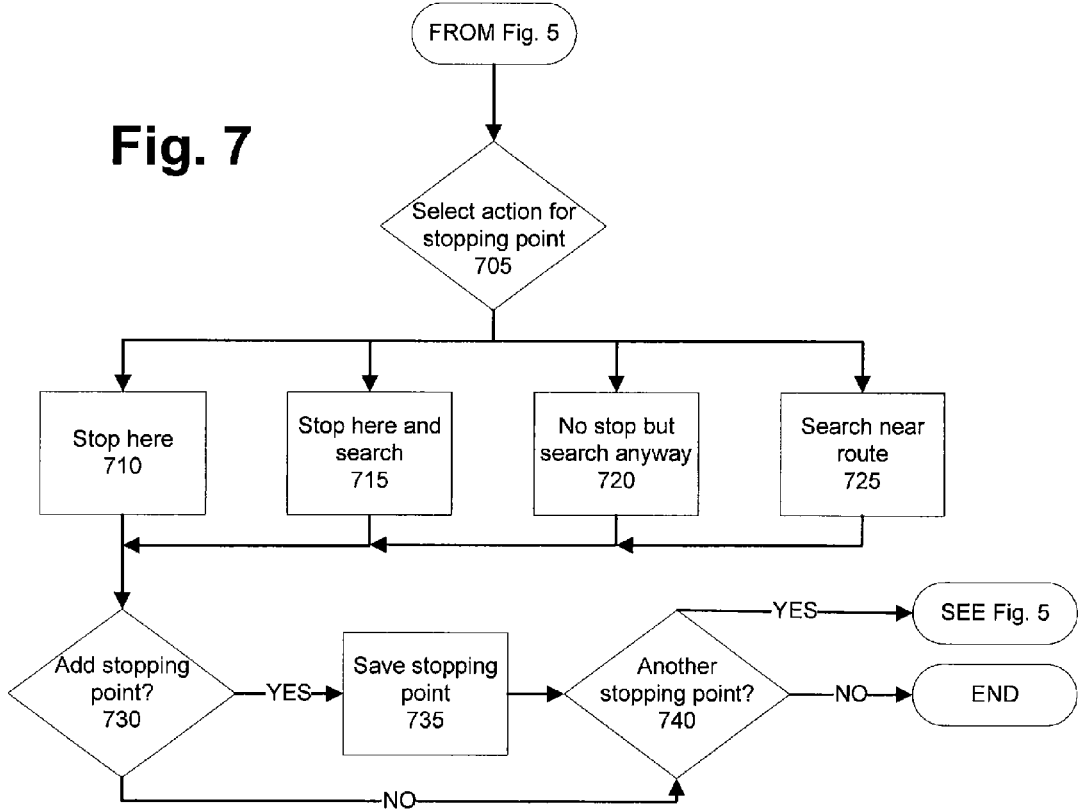
FIG. 7 depicts a process flow for selecting a stopping point by specifying a street address, according to an embodiment.

FIG. 7 depicts a process flow for selecting a stopping point by specifying a street address, according to an embodiment.

In step 705, the user 101 indicates what action the user 101 would like to take with respect to the stopping point that has been specified by a street address. Depending on the selection made in step 705, control proceeds to any one of steps 710, 715, 720 or 725.

Figure 8:
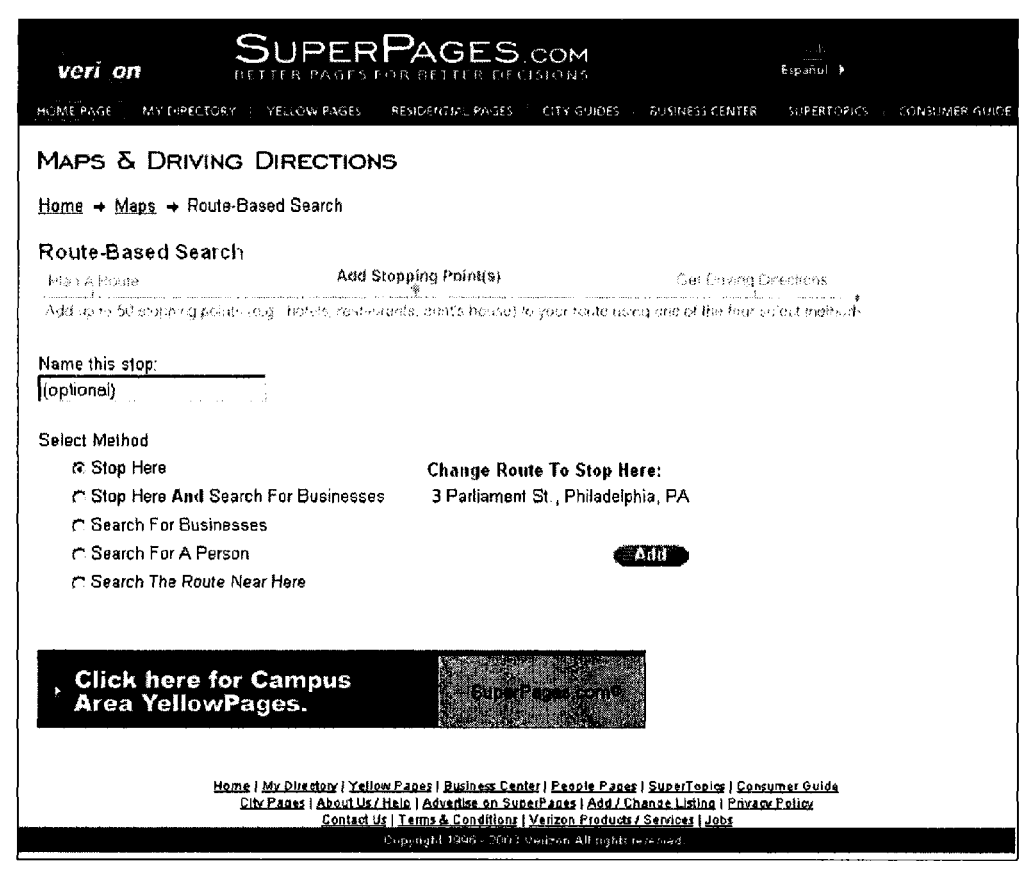

Control proceeds to step 710 if the user 101 has indicated in step 705 that the stopping point should be added to the user's route. FIG. 8 shows an exemplary user interface according to an embodiment in which a user 101 has made the selection discussed with respect to step 710. Following step 710, control proceeds to step 730.

Control proceeds to step 715 if the user 101 has made an indication both to select the stopping point and to search for places to stop within proximity to the stopping point. FIG. 9 depicts an exemplary user interface according to an embodiment, in which a user 101 has made the selection discussed with reference to step 715. Accordingly, in step 715, the user 101 is presented with a list of search results, possibly after being prompted for further criteria to narrow the search. For example, the user could be prompted to search for particular categories of businesses or other entities near the indicated stopping point. While this and other figures illustrate searching for businesses, other geographic-based searches are also possible.

Figure 14:
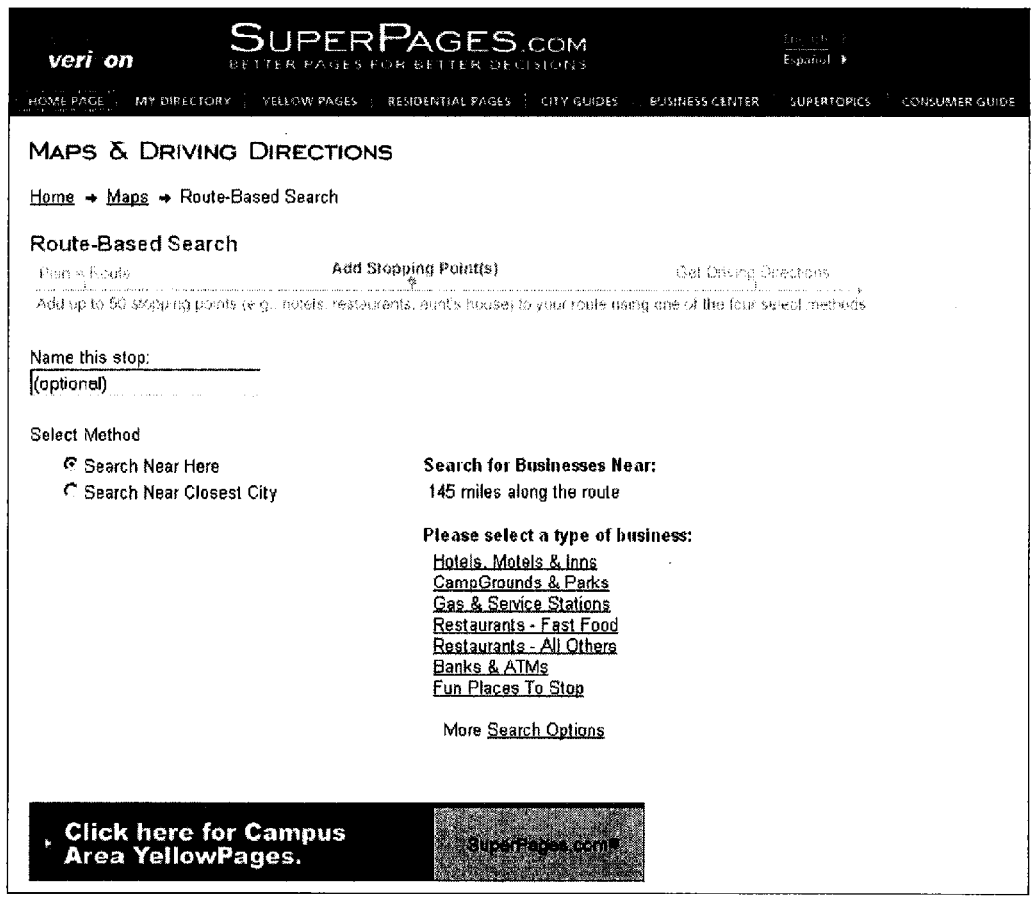
FIG. 14 depicts an exemplary user interface, according to an embodiment, for selecting a method of performing a route-based search.
Figure 19:
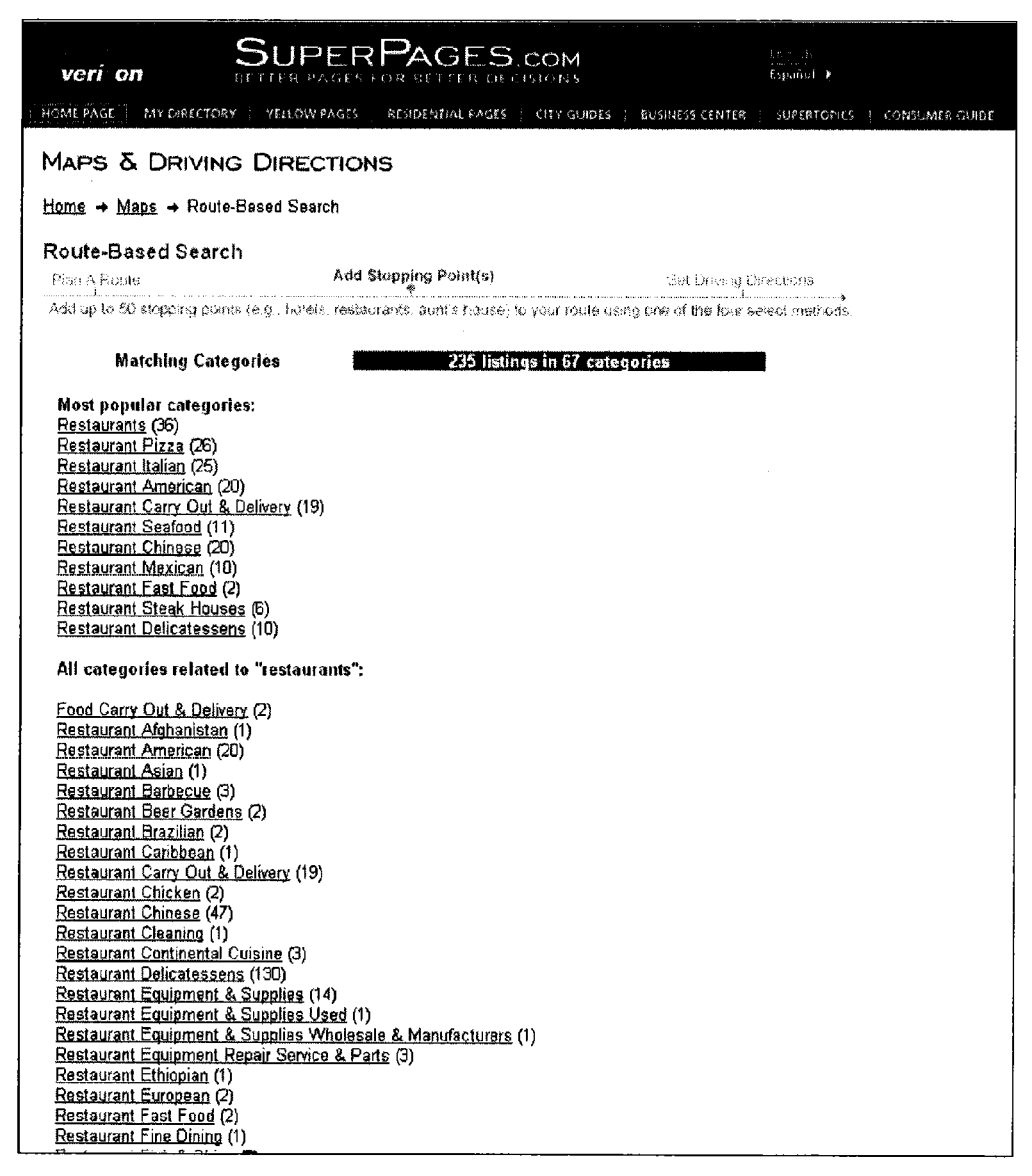
Figure 20:
FIG. 20 depicts an exemplary user interface, according to an embodiment, in which a user is presented with search results for selection.

FIG. 14 depicts an exemplary user interface according to an embodiment in which a user 101 has selected to search for places to stop near the indicated stopping point, and has been presented with a list of categories for selection. FIG. 19 depicts an exemplary user interface according to an embodiment in which a user 101 has been presented with a further list of sub-categories to further narrow the search. FIG. 20 depicts an exemplary user interface showing a list of search results. Following step 715, control proceeds to step 730.

Figure 10:
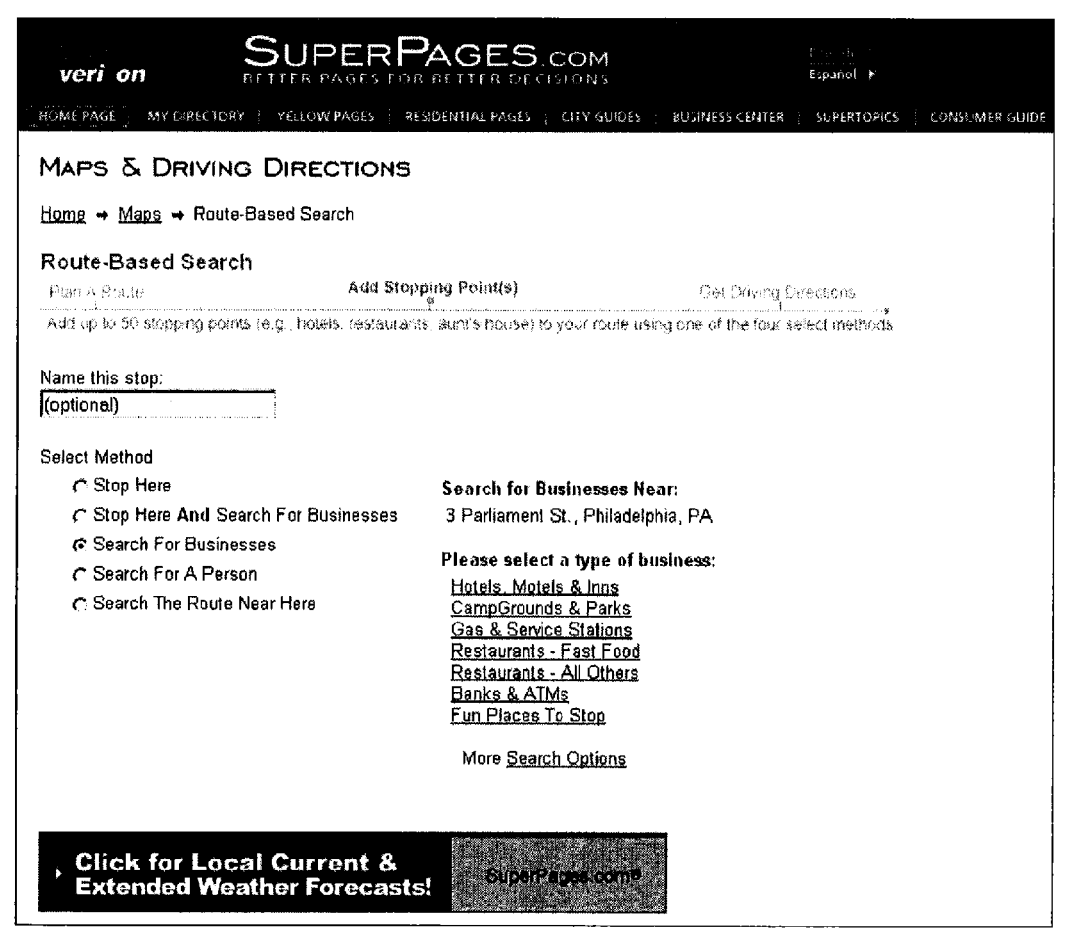
Figure 11:
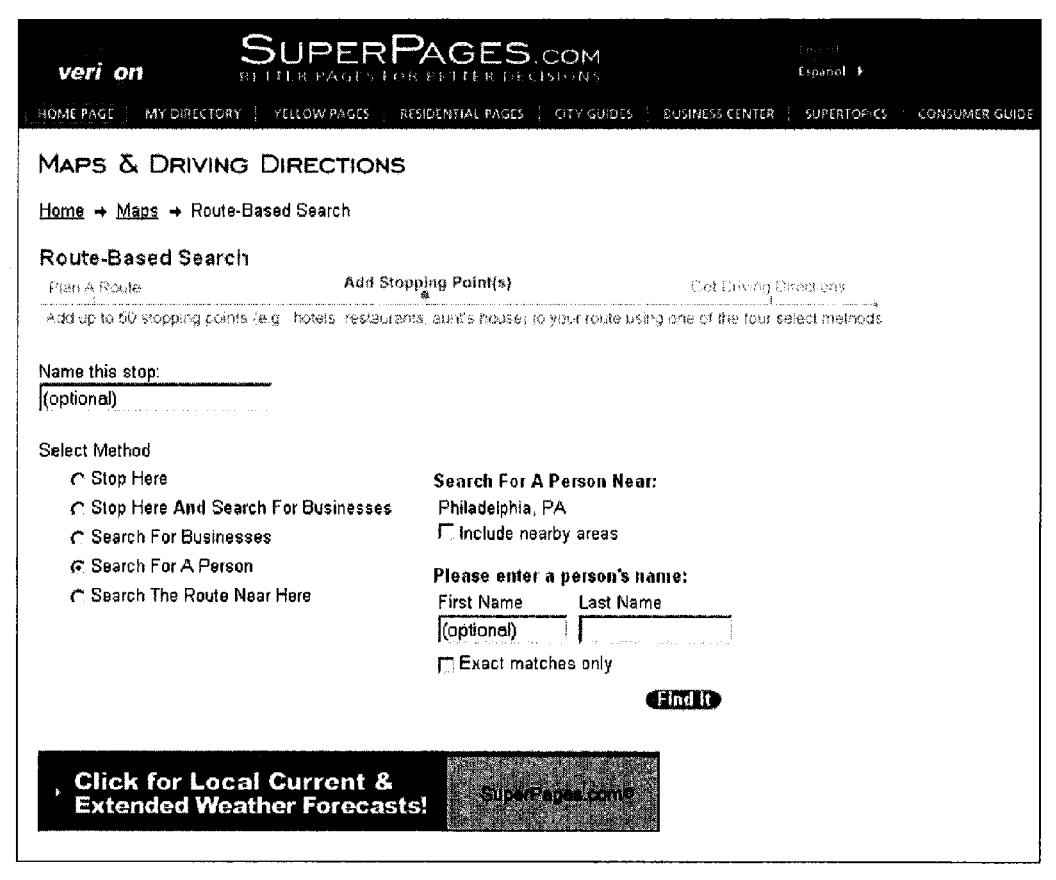

Control proceeds to step 720 if the user 101 has made an indication not to add the stopping point, but to use the stopping point as a basis for searching for possible places to stop, as discussed above with respect to step 715. FIGS. 10 and 11 depict exemplary user interfaces according to an embodiment, in which a user 101 has made indications to search as described with respect to step 720. In FIG. 10, the user 101 has indicated to search for a business near the stopping point. In FIG. 11, the user 101 has indicated to search for a person near the stopping point. Step 720 may involve presenting search interfaces and search results as discussed above regarding step 715. Following step 720, control proceeds to step 730.

Figure 12:
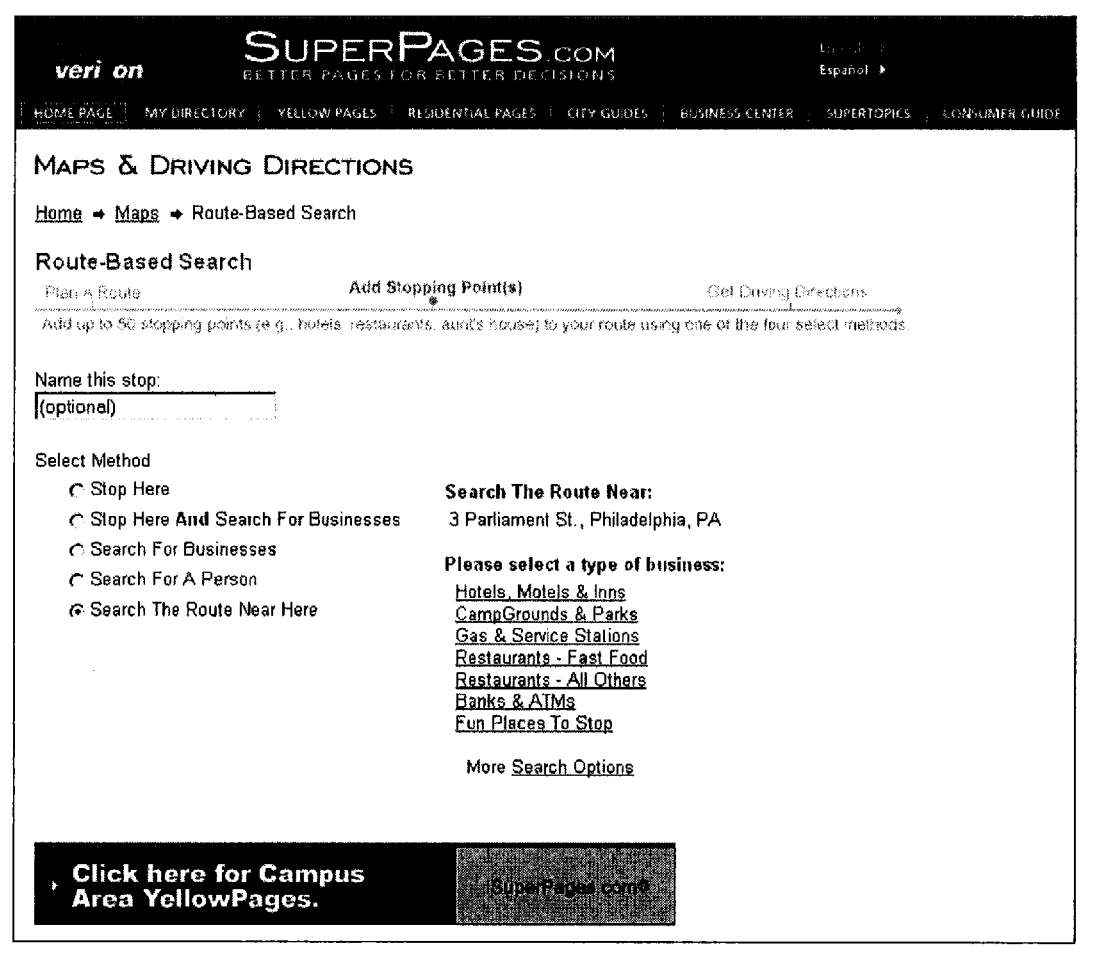

Control proceeds to step 725 if the user 101 has made an indication to search the driving route selected as described with respect to FIG. 3 at points near the selected stopping point. FIG. 12 depicts an exemplary user interface according to an embodiment in which a user 101 has made the selection discussed with respect to step 725. Step 725 may involve presenting search interfaces and search results as discussed above regarding step 715. Following step 725, control proceeds to step 730.

It should be understood that the distance from the stopping point searched in steps 715 and 720 may be provided by the user 101, or may be predetermined. Similarly, both the distance from the driving route to be searched in step 725, as well as the distance along the driving route from the stopping point to be searched, may be provided as input from the user 101, or may be predetermined.

Following each of steps 710, 715, 720 and 725, control proceeds to step 730. In step 730, the user 101 provides input indicating whether to add the selected stopping point to the driving route selected as described with reference to FIG. 3. Step 730 is optional, and in some embodiments control proceeds directly to step 735. However, if, in step 730, the user 101 indicates not to add the stopping point to the driving point, control proceeds directly to step 740. Otherwise, as just mentioned, control proceeds to step 735. In step 735, the selected stopping point is saved by server 102. In some embodiments, the selected stopping point is saved in information database 112. Control then proceeds to step 740.

In step 740, the user 101 provides input indicating whether or not the user 101 wishes to select another stopping point to be added to the driving route. If yes, control proceeds to the beginning of the process flow described with respect to FIG. 5. If no, the process described with respect to FIG. 7 ends.

Figure 13:
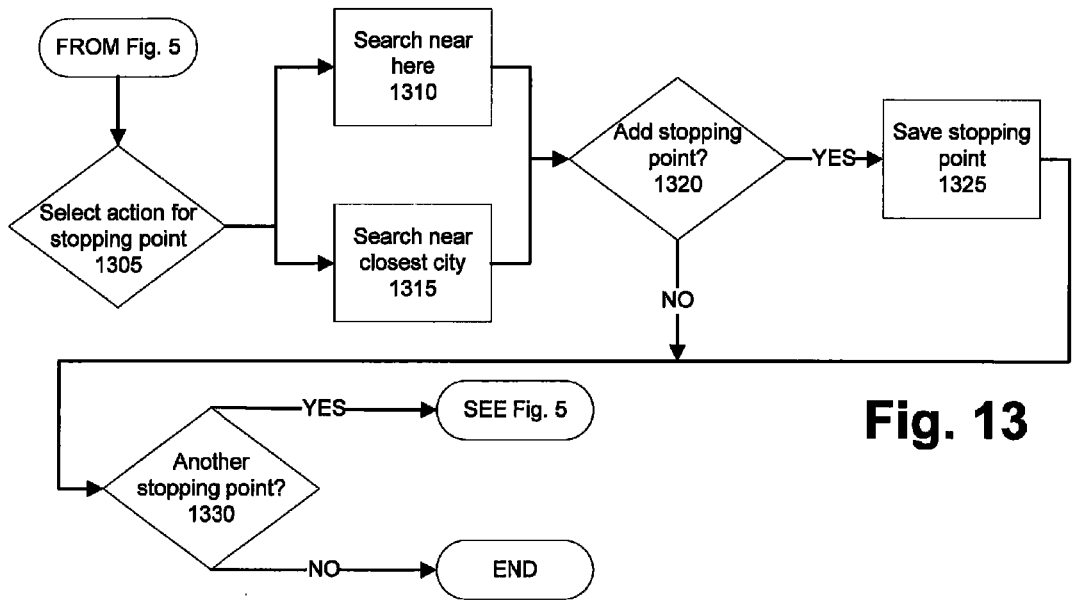
FIG. 13 depicts a process flow for selecting a stopping point based on a distance from a start point or an end point of a driving route, according to an embodiment.

FIG. 13 depicts a process flow for selecting a stopping point based on a distance from a start point or an end point of a driving route, according to an embodiment.

In step 1305, the user 101 selects an action to be taken with respect to the indicated stopping point.

Control proceeds to step 1310 if the user 101 has selected to search for places to stop near the indicated stopping point. Accordingly, in step 1310, the user 101 is presented with a list of search results, possibly after being prompted for further criteria to narrow the search. For example, the user could be prompted to search for particular categories of businesses or other entities near the indicated stopping point. FIG. 14 depicts an exemplary user interface according to an embodiment in which a user 101 has selected to search for places to stop near the indicated stopping point, and has been presented with a list of categories for selection. FIG. 19 depicts an exemplary user interface according to an embodiment in which a user 101 has been presented with a further list of sub-categories to further narrow the search. FIG. 20 depicts an exemplary user interface showing a list of search results. Following step 1310, control proceeds to step 1320.

Figure 15:
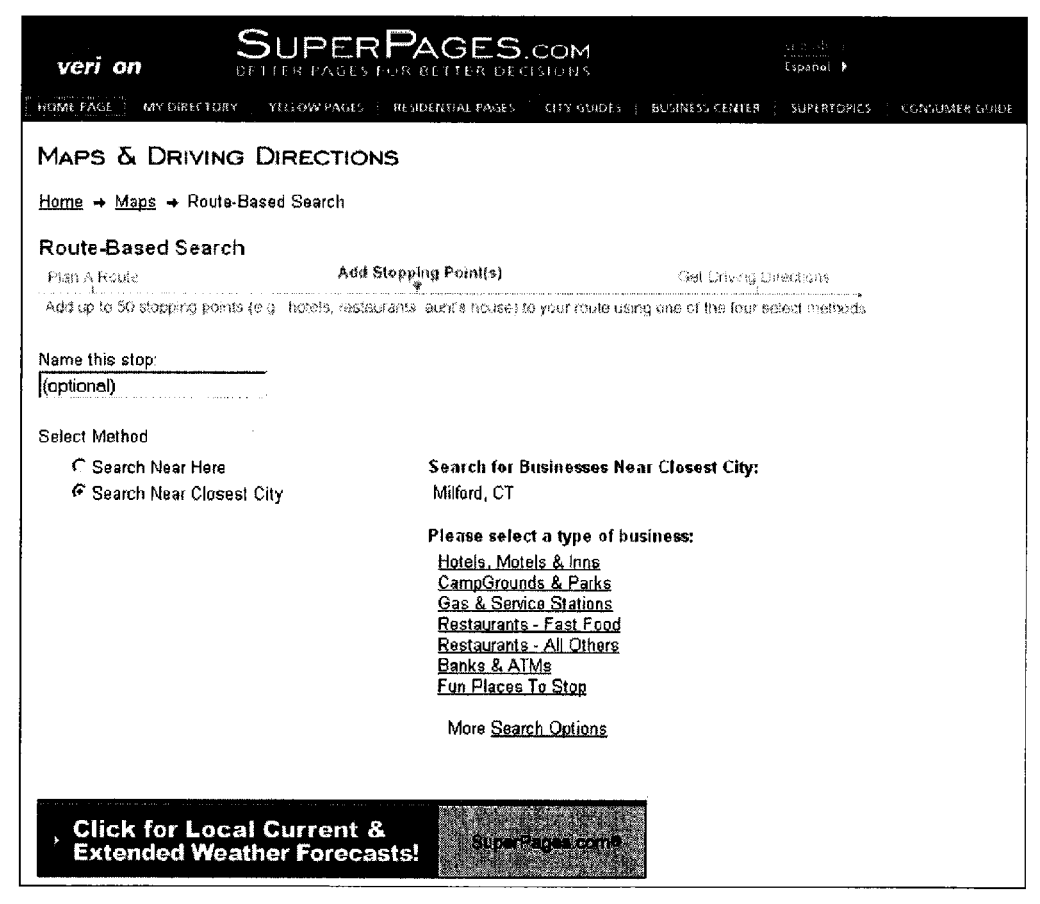

Control reaches step 1315 if the user 101 has indicated to search near the closest city to the indicated stopping point. FIG. 15 shows an exemplary user interface according to an embodiment in which a user 101 has to search near the closest city to the indicated stopping point. Further, it should be understood that interfaces such as those shown in FIGS. 14, 19, and 20, discussed above with reference to step 1310, could also be presented to the user 101 in step 1315. Following step 1315, control proceeds to step 1320.

In step 1320, the user 101 is prompted for an indication as to whether the stopping point should be added to the driving route. If not, control proceeds to step 1330. If yes, control proceeds to step 1325.

In step 1325, the stopping point is saved in information database 112. Control then proceeds to step 1330.

In step 1330, the user 101 provides input indicating whether or not the user 101 wishes to select another stopping point to be added to the driving route. If yes, control proceeds to the beginning of the process flow described with respect to FIG. 5. If no, the process described with respect to FIG. 13 ends.

Figure 16:
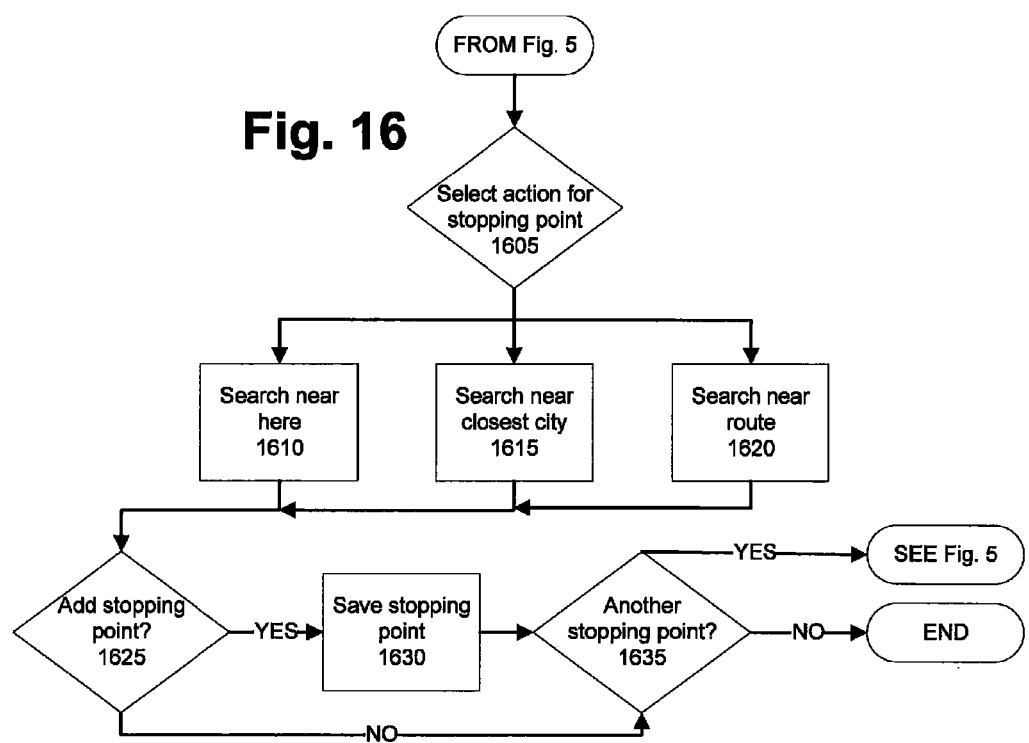
FIG. 16 depicts a process flow for adding a stopping point to a driving route based on a selection from an interactive map, according to an embodiment.
Figure 17:
FIG. 17 shows an exemplary user interface, according to an embodiment, in which a user has indicated to select a stopping point using an interactive map.

FIG. 16 depicts a process flow for adding a stopping point to a driving route based on a selection from an interactive map, according to an embodiment. FIG. 17 shows an exemplary user interface according to an embodiment in which a user 101 has indicated to select a stopping point using an interactive map. Those skilled in the art will recognize that a user 101 could select a stopping point using an interactive map by clicking on a point on the map.

In step 1605, the user 101 selects an action for the indicated stopping point. Control then proceeds to one of steps 1610, 1615, or 1620.

In step 1610, the user 101 is able to search for places to stop near the indicated stopping point. Step 1610 is similar to step 715 described above with reference to FIG. 7.

In step 1615, the user 101 has made an indication to search near the city closest to the indicated stopping point. Step 1615 is similar to step 1315 described above with reference to FIG. 13.

In step 1620, the user 101 has made an indication to search for places to stop near the indicated stopping point along the route selected, for example, as described above with reference to FIG. 3. Step 1620 is similar to step 725 described above with reference to FIG. 7.

Steps 1625 through 1635 are similar to steps 730 through 740 described above with reference to FIG. 7.

Figure 18:
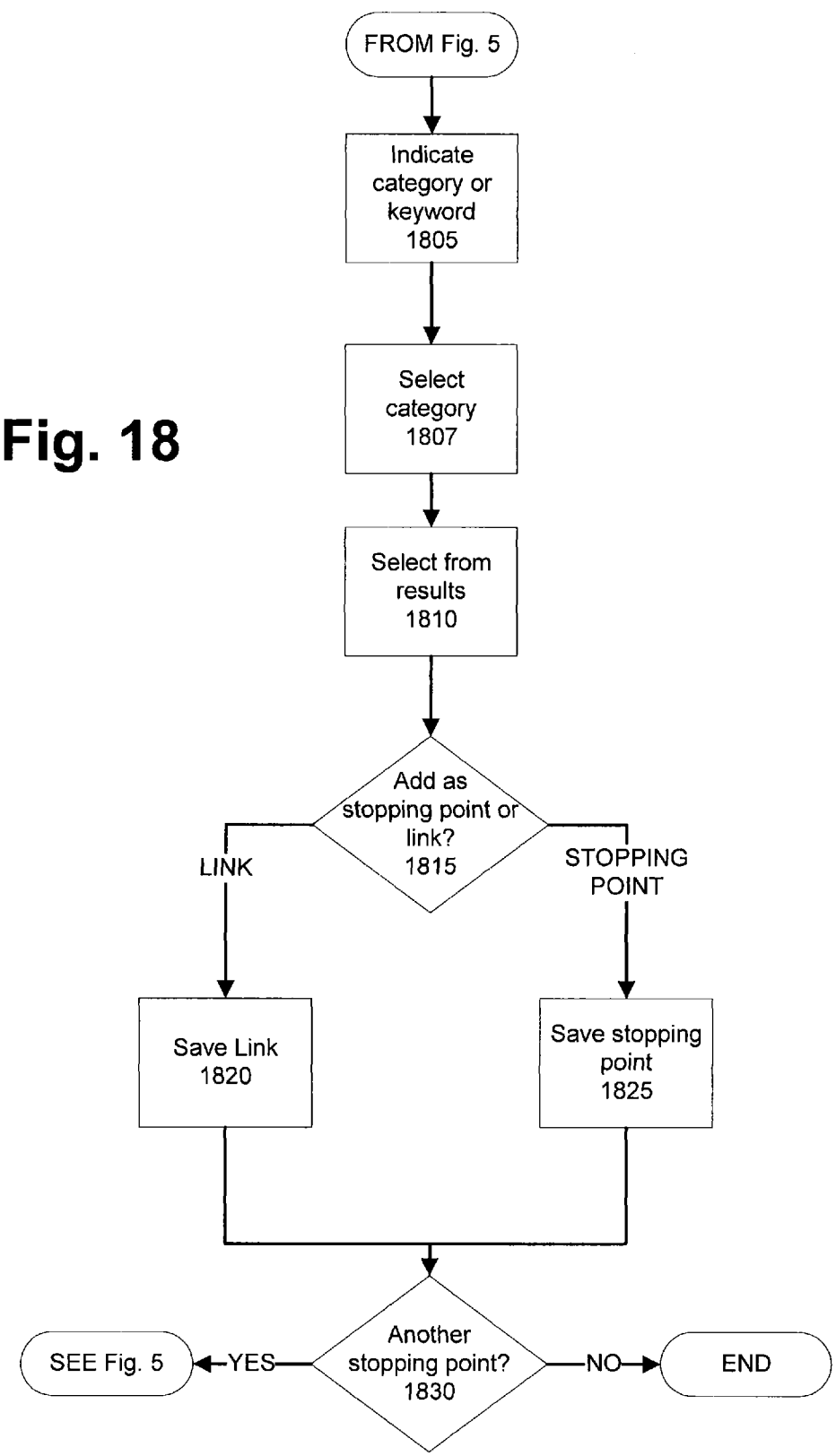
FIG. 18 depicts a process flow for searching for a stopping point by indicating a category or a key work within which to search, according to an embodiment.

FIG. 18 depicts a process flow, used in some embodiments, for searching for a stopping point by indicating either a category or a key word within which to search, and for incorporating the stopping point into a driving route. As mentioned above, category and key word searching are more fully explained in the related applications referenced above. In some embodiments, the process of flow of FIG. 18 may be implemented as an alternative to some or all of steps 730-740 described above with reference to FIG. 7, steps 1320-1330 described above with reference to FIG. 13, and/or steps 1625-1635 described above with reference to FIG. 16.

In step 1805, the user 101 indicates either a category or a key word within which to search. Referring back to FIGS. 9, 10 and 12, exemplary user interfaces according to an embodiment are shown in which a user 101 can select a category, e.g., a type of business, within which to search for a place to stop along a driving route. Further, referring back to FIG. 11, an exemplary user interface is shown in which the user 101 can indicate a key word or key words, e.g., the name of a person, within which to search for a place to stop along the driving route.

Step 1807 is optional, and is generally used in embodiments in which a user 101 has indicated a category search in step 1805. In step 1807, a user 101 is presented with a list of categories possibly responsive to the request submitted in step 1805; the user 101 may select a category to see a listing of search results relevant to that category. FIG. 19 is an exemplary user interface according to an embodiment in which user 101 can select a category as just described, following a selection made in the user interface depicted with reference to FIG. 10.

In step 1810, the user 101 selects from the results of the search undertaken within the category or key words provided as described above with respect to step 1805. FIG. 20 depicts an exemplary user interface according to an embodiment in which a user 101 is presented with search results for selection.

Figure 21:
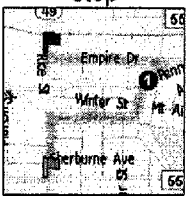
FIG. 21 depicts an exemplary user interface, according to an embodiment, in which a user selects to add points as either stopping points or links to a driving route.

In step 1815, after the user has selected search results to be included in the driving route, the user 101 indicates whether the point is to be added as a stopping point or as a link. If a stopping point is added, the driving route will be altered to include whatever addresses are associated with selected stopping points. On the other hand, if the user 101 selects to add the points as links, the driving route will not be altered, but driving directions to and from the driving route will be provided for the indicated point. FIG. 21 depicts an exemplary user interface according to an embodiment in which a user 101 selects to add points as either stopping points or links to a driving route. Points added as stopping points are shown on FIG. 23A. Points added as links are shown on FIG. 23B.

Control proceeds to step 1820 if the user 101 has selected to add a point as a link in step 1815. In step 1820, the link is saved and associated with the user 101 in the indicated driving route. Generally, this information is saved on server 102 in flash or information database 112.

Control proceeds to step 1825 when the user 101 has selected to save a point as a stopping point in step 1815. In step 1825, the point is saved as a stopping point and associated with the user 101, generally on server 102 or in information database 112.

Figure 22:
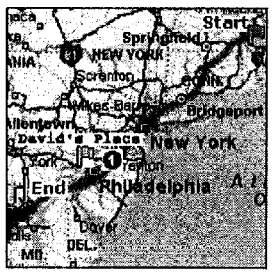
FIG. 22 shows an exemplary user interface, according to an embodiment, in which a user is presented with a list of stopping points added thus far to the driving route, and provided with the opportunity to find another stopping point.

Following either of steps 1820 and 1825, control proceeds to step 1830. In step 1830, it is determined whether or not the user 101 wishes to find another stopping point along the indicated driving route. FIG. 22 shows an exemplary user interface according to an embodiment in which a user 101 is presented with a list of stopping points added thus far to the driving route, and provided with the opportunity to find another stopping point.

Figure 23A:
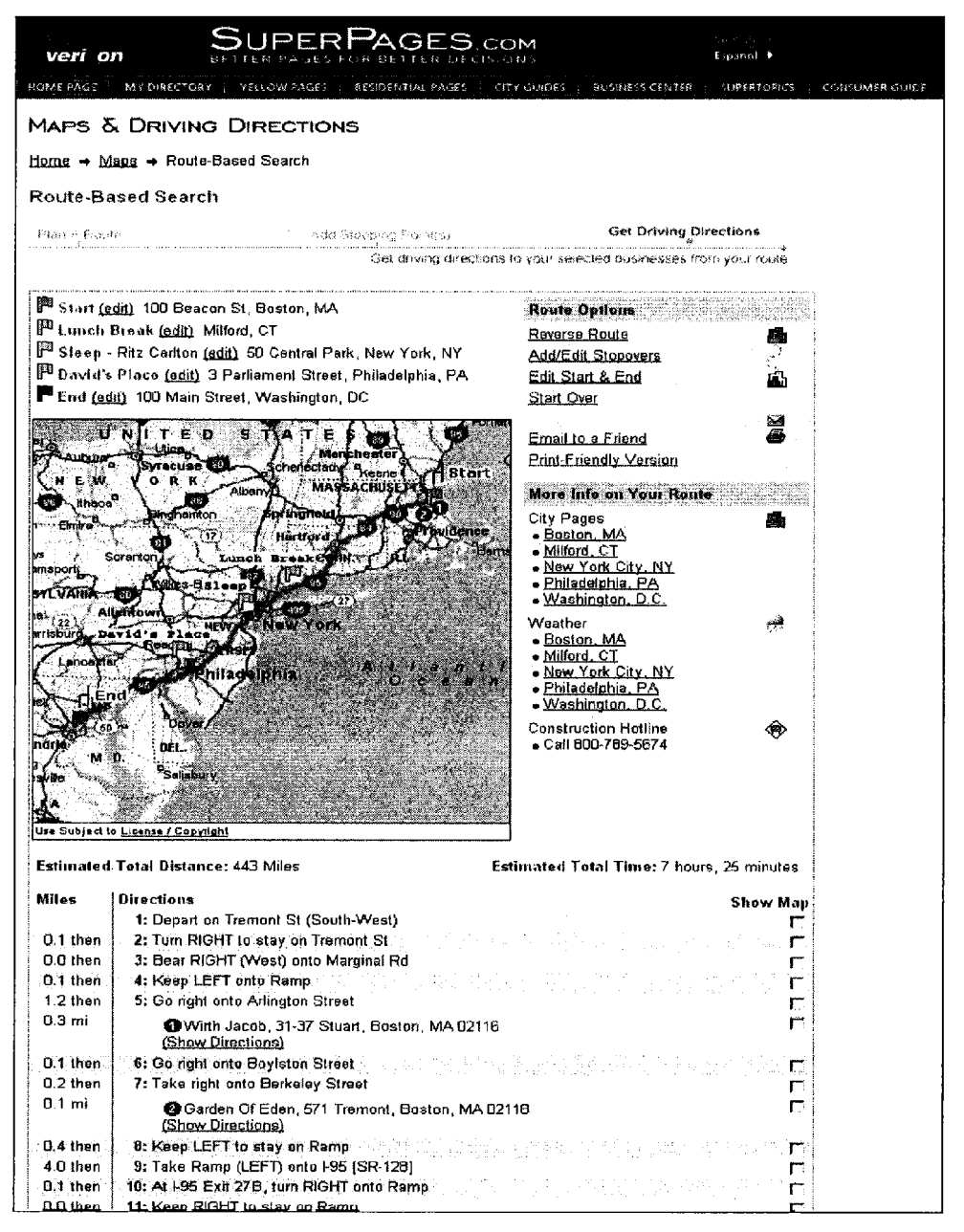

FIGS. 23A and 23B show an exemplary user interface according to an embodiment in which driving directions with stopping points and links to possible points of interest are included.

While the present invention has been particularly shown and described with reference to the foregoing preferred and alternative embodiments, it should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application.

The invention claimed is:

1. A method, comprising:
   generating, at a computing device, a route between a start point and an end point;
   providing a plurality of stopping point search options;
   receiving a selection of at least one of the stopping point search options;
   providing a listing of potential stopping points based on the selected stopping point search option;
   receiving a selection of at least one of the potential stopping points;
   providing a plurality of stopping point action options with respect to the selected stopping point, the selected stopping action options including at least an option to save the selected stopping point without adding the stopping point to the route, and also including adding the selected stopping point to the route and simultaneously conducting a search for at least one of a business, a person, and a category within a pre-determined proximity to the selected stopping point;
   receiving a selection of at least one of the stopping point action options;
   updating the route according to the selected stopping point action option; and
   providing the updated route to a computing device via a network.

2. The method of claim 1, further comprising:
   providing a graphical user interface to a computing device via a network; and
   receiving the start point and the end point from the computing device via the network.

3. The method of claim 1, the plurality of stopping point search options including at least a subset of the following options to search for a stopping point by: specifying an address, specifying a distance, specifying a point on a map, performing a keyword search, and performing a category search.

4. The method of claim 1, the plurality of stopping point search options including searching for points of interest associated with at least one of a business and a person within a pre-determined distance along the route.

5. The method of claim 1, the plurality of stopping point action options further including at least a subset of the following options: adding the stopping point to the route, and searching for a point of interest according to the stopping point.

6. The method of claim 1, further comprising:
   generating directions between the route and the stopping point without altering the route between the start point and the end point, the directions including directions from the route to the stopping point, and directions from the stopping point back to the route.

7. The method of claim 1, further comprising:
   providing an interface to receive another stopping point; and
   providing the plurality of stopping point action options in response to a selection of another stopping point being received.

8. The method of claim 1, further comprising adding the stopping point to the route by revising the route between the start point and the end point to include the stopping point.

9. The method of claim 1, wherein the at least one of a business, a person and a category are distinct from the selected stopping point such that at least one stopping point is selected before the search for the at least one of a business, a person and a category is performed.

10. A system, comprising:
at least one database comprising map data and data related to locations of a plurality of entities; and
a server in selective communication with the at least one database and a client device, the server being configured to:
generate a route that includes directions between a start point and an end point, provide a plurality of entity search options,
receive a selection of at least one of the entity search options,
provide a listing of entities based on the selected entity search option,
receive a selection of at least one entity of the listing of entities,
provide a plurality of action options with respect to the selected entity, the action options including at least an option to save the selected entity without adding the selected entity to the route and also including an option to add the selected entity to the route and simultaneously conduct a search for at least one of a business, a person, and a category within a pre-determined proximity to the selected entity,
receive a selection of at least one of the action options,
update the route according to the selected action option, and
provide the updated route to a client device via a network.

11. The system of claim 10, the plurality of entity search options including at least a subset of the following options to search for an entity by: specifying an address, specifying a distance, specifying a point on a map, performing a keyword search, and performing a category search.

12. The system of claim 10, the plurality of entity search options including an option to search for points of interest associated with at least one of a business and a person within a pre-determined distance along the route.

13. The system of claim 10, the plurality of action options further including at least a subset of the following options: adding the entity to the route, and searching for a point of interest according to the location of the entity.

14. The system of claim 10, the server being further configured to:
generate directions between the route and the entity without altering the route between the start point and the end point, the directions including directions from the route to the entity, and directions from the entity back to the route.

15. The system of claim 10, the server being further configured to:
provide an interface to receive another entity selection; and
provide the plurality of action options when another entity selection is received.

16. The system of claim 10, the server being further configured to add the entity to the route by revising the route between the start point and the end point to include the entity.

17. The system of claim 10, wherein the at least one of a business, a person and a category are distinct from the selected entity such that at least one entity is selected before the search for the at least one of a business, a person and a category is performed.

18. A method, comprising:
providing, by a computing device, a graphical user interface to a computing device via a network;
receiving a start point and an end point from the computing device;
generating a route between the start point and the end point;
providing the route to the computing device;
providing a plurality of stopping point search options to the computing device;
receiving a selection of at least one of the stopping point search options from the computing device;
providing a listing of potential stopping points based on the selected stopping point search option;
receiving a selection of at least one of the potential stopping points;
determining, by a server device, providing a plurality of stopping point action options with respect to the selected stopping point, the stopping action options including at least an option to save the selected stopping point without adding the selected stopping point to the route and also including an option to add the selected stopping point to the route and simultaneously conduct a search for at least one of a business, a person, and a category within a pre-determined proximity to the selected stopping point;
receiving a selection of at least one of the stopping point action options;
receiving a selection of at least one additional stopping point;
providing the plurality of stopping point action options with respect to the at least one additional stopping point;
updating the route based on the selected stopping point action options; and
providing the updated route to the computing device.

19. The method of claim 18, the plurality of stopping point search options including at least a subset of the following options to search for a stopping point by: specifying an address, specifying a distance, specifying a point on a map, performing a keyword search, and performing a category search.

20. The method of claim 18, the plurality of stopping point action options further including at least a subset of the following options: adding the stopping point to the route, and searching for a point of interest according to the stopping point.

21. The method of claim 18, further comprising:
generating directions between the route and the stopping point without altering the route between the start point and the end point, the directions including directions from the route to the stopping point, and directions from the stopping point back to the route.

22. The method of claim 18, wherein the at least one of a business, a person and a category are distinct from the selected stopping point such that at least one stopping point is selected before the search for the at least one of a business, a person and a category is performed.

* * * * *